US008411474B2

(12) United States Patent
Roesner et al.

(10) Patent No.: US 8,411,474 B2
(45) Date of Patent: Apr. 2, 2013

(54) SYSTEM AND METHOD FOR PROTECTION OF A MULTILEVEL CONVERTER

(75) Inventors: Robert Roesner, Unterfoehring (DE); Stefan Schroeder, Munich (DE)

(73) Assignee: General Electric Company, Niskayuna, NY (US)

( * ) Notice: Subject to any disclaimer, the term of this patent is extended or adjusted under 35 U.S.C. 154(b) by 405 days.

(21) Appl. No.: 12/770,800

(22) Filed: Apr. 30, 2010

(65) Prior Publication Data

US 2011/0267862 A1 Nov. 3, 2011

(51) Int. Cl.
*H02H 7/122* (2006.01)
(52) U.S. Cl. .................................. 363/56.01
(58) Field of Classification Search ............ 363/39, 363/40, 50, 55, 56.01, 131
See application file for complete search history.

(56) References Cited

U.S. PATENT DOCUMENTS

| | | | |
|---|---|---|---|
| 5,444,594 A | 8/1995 | Tanaka et al. | |
| 5,561,393 A | 10/1996 | Sakurai et al. | |
| 5,982,646 A * | 11/1999 | Lyons et al. | 363/58 |
| 6,031,738 A * | 2/2000 | Lipo et al. | 363/37 |
| 6,333,569 B1 * | 12/2001 | Kim | 307/31 |
| 6,369,543 B1 | 4/2002 | Masselus et al. | |
| 7,050,311 B2 * | 5/2006 | Lai et al. | 363/37 |
| 7,606,052 B2 * | 10/2009 | Akagi | 363/40 |
| 7,920,393 B2 * | 4/2011 | Bendre et al. | 363/39 |
| 8,228,695 B2 * | 7/2012 | Roesner et al. | 363/56.01 |
| 2006/0056209 A1 * | 3/2006 | Blidberg et al. | 363/63 |
| 2006/0221653 A1 * | 10/2006 | Lai et al. | 363/37 |
| 2009/0303764 A1 * | 12/2009 | Jin et al. | 363/87 |
| 2011/0141786 A1 * | 6/2011 | Shen et al. | 363/131 |
| 2011/0235376 A1 * | 9/2011 | Feng et al. | 363/65 |
| 2012/0025609 A1 * | 2/2012 | West | 307/31 |
| 2012/0163044 A1 * | 6/2012 | Mayor Miguel et al. | 363/37 |

FOREIGN PATENT DOCUMENTS

DE 10205963 A1 9/2003

OTHER PUBLICATIONS

Search Report and Written Opinion from corresponding EP Application No. 11163978.7-1242 dated Jun. 25, 2012.

* cited by examiner

*Primary Examiner* — Adolf Berhane
(74) *Attorney, Agent, or Firm* — Ann M. Agosti

(57) ABSTRACT

A three level neutral point clamped (NPC) converter includes a plurality of phase legs each having at least two inner switching devices, at least two outer switching devices, at least two clamping diodes, and a protection circuit. An inner component failure sensing circuit is employed in the protection circuit to detect a failure condition in any of the inner switching devices or clamping diodes. The protection circuit further includes a gating signal generation circuit configured to generate a turn ON signal for a respective outer switching device that is adjacent to the failed inner switching device or the clamping diode.

14 Claims, 4 Drawing Sheets

SYSTEM AND METHOD FOR PROTECTION OF A MULTILEVEL CONVERTER

BACKGROUND

This invention relates generally to a neutral point clamped (NPC) or diode clamped multilevel converter, and, more specifically, to a method for protection of a multilevel converter.

A diode clamped multilevel converter is generally used in high power industrial applications such as variable speed drive (VSD) systems or in energy conversion applications such as a solar (or photovoltaic) or wind power generating systems. Multilevel converters synthesize a sinusoidal voltage by several levels of voltages, typically obtained from capacitor voltage sources. A three level converter includes two capacitor voltages in series. Each phase leg of the three-level converter has four switching devices in series and two diodes to clamp to the capacitor center point.

The switching devices in a multilevel converter experience high electrical and thermal stress during short-circuit conditions. For example, if there is large power loss within the switching device due to electrical stress or overcurrent conditions, the switching device overheats and may experience thermal breakdown. Once a switching device is broken down or destroyed, without protective measures, a chain reaction may occur and result in destruction of the other switching devices within the converter bridge. Some techniques for protecting the converter bridge include employing a snubber circuit or a crowbar circuit. However, use of additional hardware to is a costly and complex solution.

Therefore, it is desirable to provide a method and a system that will address the foregoing issues.

BRIEF DESCRIPTION

In accordance with an embodiment of the present invention, a three level neutral point clamped (NPC) converter is provided. The three level NPC converter includes a plurality of phase legs each having at least two inner switching devices, at least two outer switching devices and at least two clamping diodes and a protection circuit. The protection circuit includes an inner component failure sensing circuit to detect a failure condition in any of the inner switching devices or clamping diodes. A gating signal generation circuit is also employed in the protection circuit to generate a turn ON signal for a respective outer switching device that is adjacent to the failed inner switching device or the clamping diode.

In accordance with another embodiment of the present invention, a method of protecting a three level power converter including DC link capacitors and phase legs including switching devices and connected to a power network is provided. The method includes blocking charging of at least one DC link capacitor by short circuiting the power network through network impedances and turning off at least some of the switching devices.

In accordance with yet another embodiment of the present invention, a protection circuit for a three level NPC converter including a plurality of phase legs each having at least two inner switching devices, at least two outer switching devices and at least two clamping diodes is provided. The protection circuit includes an inner component failure sensing circuit to detect a failure condition in any of the inner switching devices or clamping diodes. The protection circuit also includes a gating signal generation circuit to generate a turn ON signal for a respective outer switching device that is adjacent to the failed inner switching device or the clamping diode and to generate turn OFF signals for remaining switching devices in the three level NPC converter.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
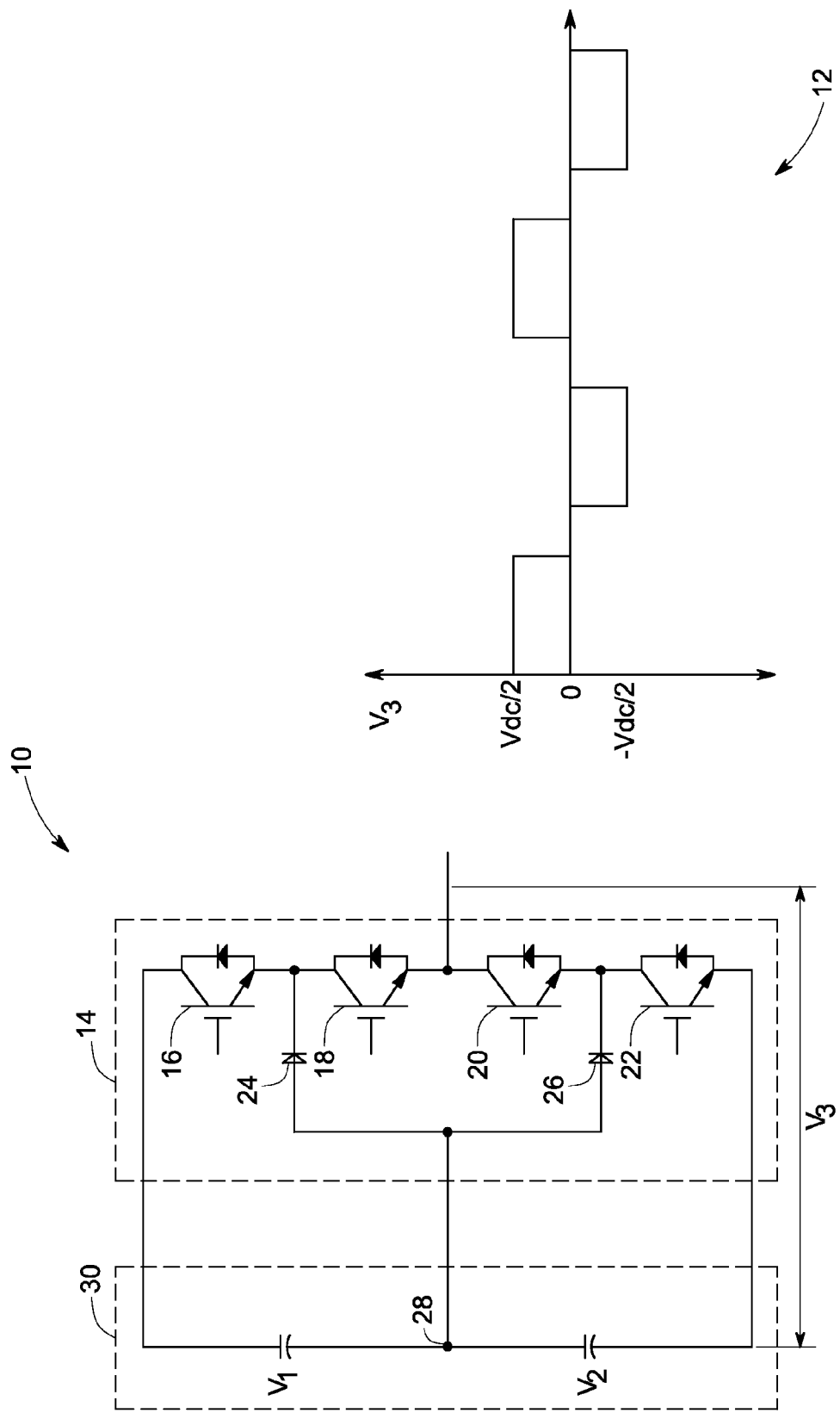
FIG. 1 is a circuit diagram of one phase leg of a conventional neutral point clamped multilevel converter and an output waveform.

As discussed in detail below, embodiments of the present invention enable a multilevel converter to convert a direct current (DC) power into an alternating current (AC) power with a protection scheme. For a three level Neutral Point Clamped (NPC) converter, a key failure mode exists when an inner switching device (18 or 20 of FIG. 1) or a clamping diode (24 or 26 of FIG. 1) fails. Under this condition, one half of the DC link, V1 or V2 in FIG. 1, is charged to the peak line-to-line voltage of the machine or grid side voltage. This value is typically higher than the maximum allowed blocking voltage of the switching devices and the capacitors. Hence, this will cause additional switching devices, in particular switching devices in phase legs connected to same DC bus, to fail after the failure of to the initial switching device. The protection scheme of the present invention provides a suitable control logic to protect switching devices in phase legs connected to same DC bus using the existing semiconductor switches.

FIG. 1 illustrates a schematic 10 of one leg or one phase of a conventional neutral point clamped (NPC) or diode clamped three level converter and its output waveform 12. One leg 14 of the three-level converter includes four switching devices 16, 18, 20, and 22 and two diodes 24 and 26. Input voltages V1 and V2 are controlled each have a voltage equal to Vdc/2, where Vdc is the total DC link voltage. Voltage V3 is the phase A output voltage measured with respect to a center point 28 of DC link 30. Switching device 16 is complementary to switching device 20 so that, when the switching device 16 is conducting, switching device 20 is not conducting and vice versa. Similarly, switching devices 18 and 22 are complementary.

In operation, each leg of the NPC three level converter has three switching stages. In the first switching stage, switching devices 16 and 18 are turned on and switching devices 20 and 22 are turned off. Assuming a stable operation, V1=V2=Vdc/2, and V3 becomes Vdc/2. In the second switching stage, switching devices 18 and 20 are turned on while switching devices 16 and 22 are turned off. In this stage, V3 is equal to zero. In the third switching stage, switching devices 16 and 18 are turned off whereas switching devices 20 and 22 are turned on. This results in V3 becoming −Vdc/2 as shown in a waveform 12. Thus, it can be seen that the phase voltage V3 has three levels Vdc/2, −Vdc/2 and 0. When all three legs of the NPC three-phase converter are combined, then the resulting line to line voltages have five levels namely Vdc, Vdc/2, 0, −Vdc/2 and −Vdc. The three-level converter 14 of FIG. 1 may be increased to any level depending on the circuit topology and number of switching devices and diodes in the circuit. As the number of levels in the converter increases, the output waveform of the converter approaches a pure sine wave, resulting in lower harmonics in the output voltage.

Figure 2:
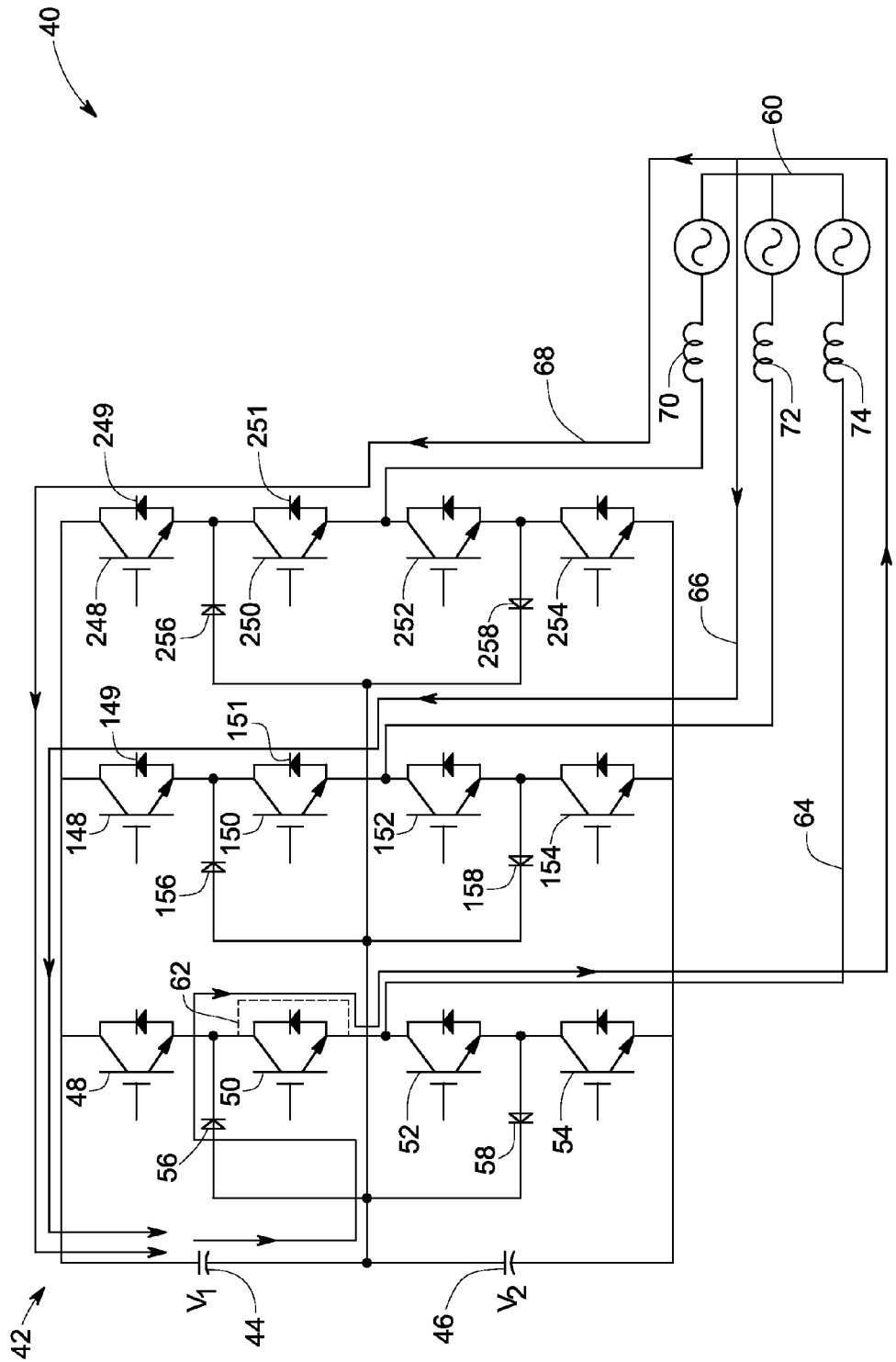
FIG. 2 is a circuit diagram of a three phase three level NPC converter connected to a power grid illustrating current paths in case of a semiconductor failing short.

FIG. 2 illustrates a circuit diagram 40 of a three phase three level NPC converter 42 connected to a power grid 60. NPC converter 42 includes a split DC link with a top capacitor 44 and a bottom capacitor 46 and three legs, each associated with a different phase. As described earlier, each phase of the converter 42 includes two outer and two inner switching devices for example, outer switching devices 48 and 54 and inner switching devices 50 and 52 for phase C; outer switching devices 148 and 154 and inner switching devices 150 and 152 for phase B, and outer switching devices 248 and 254 and inner switching devices 250 and 252 for phase A respectively. Further, each leg comprises two clamping diodes 56, 58 for phase C; 156, 158 for phase B, and 256 and 258 for phase A. NPC converter 42 is connected to power grid 60. In one embodiment, NPC converter 42 may be connected to grid 60 through transformers or grid impedances 70, 72, and 74. In another embodiment, instead of being connected to a power grid, the NPC converter may be connected to a load (not shown) such as an electric motor or an electric generator.

During normal operation, NPC converter 42 converts input DC power to output AC power and transfers it to the grid or the load. In one embodiment, the input DC power to the NPC converter may be supplied by a power source (not shown) such as a photovoltaic cell, a fuel cell, or a battery source. Capacitors 44 and 46 then get charged to voltages V1, V2 respectively, equal to Vdc/2, wherein Vdc is the rated DC link voltage.

In one embodiment, NPC converter 42 can also be operated as an active rectifier to convert AC power to DC power. In another embodiment, a back-to-back connection of two NPC converters with a common DC bus is utilized. In this embodiment, the first NPC converter will convert AC power to power the common DC bus and the second NPC converter will convert DC power to AC. This embodiment is used to convert AC power with a certain voltage and frequency to a second AC power with different voltage and/or frequency. Possible application would be to convert AC power from a variable speed power source (e.g. wind turbine or small water power plant) for use by a fixed frequency AC power grid.

FIG. 2 further shows a fault condition in converter 42, wherein inner switching device 50 of phase C fails short (represented by referral numeral 62). The condition may occur as a result of occurrences such as, for example, thermal breakdown of inner switching device 50, the voltage breakdown of inner switching device 50, failures due to cosmic rays, and failures due to weak manufacturing of the switching device. When the breakdown of switching device 50 is detected, the switching pulses to the remaining switching devices are blocked i.e., remaining switching devices are turned off. However, because of the presence of a power grid 60, freewheeling diodes 149, 151, 249, and 251 of the top switching devices keep conducting. Phase A and phase B currents enter top capacitor 44 through freewheeling diodes 149, 151, and 249, 251 respectively and the output current from top capacitor 44 enters phase C through clamping diode 56 and shorted switching device 50. Thus, top capacitor 44 is charged to the peak line-to-line voltage of the grid side or machine side voltage through the three phase current paths 64, 66, and 68. The peak line-to-line voltage may go up to double the nominal operating voltage of top capacitor 44 (Vdc/2), which is higher than the maximum allowed blocking voltage of the switching devices and the capacitors utilized in the NPC converter. Since the remaining switching devices observe voltages higher than their blocking voltage, these conditions result in overvoltage conditions and failure of other switching devices in all phase legs connected to a common DC bus (that is, not only the phase leg that has the failed inner switch).

Figure 3:
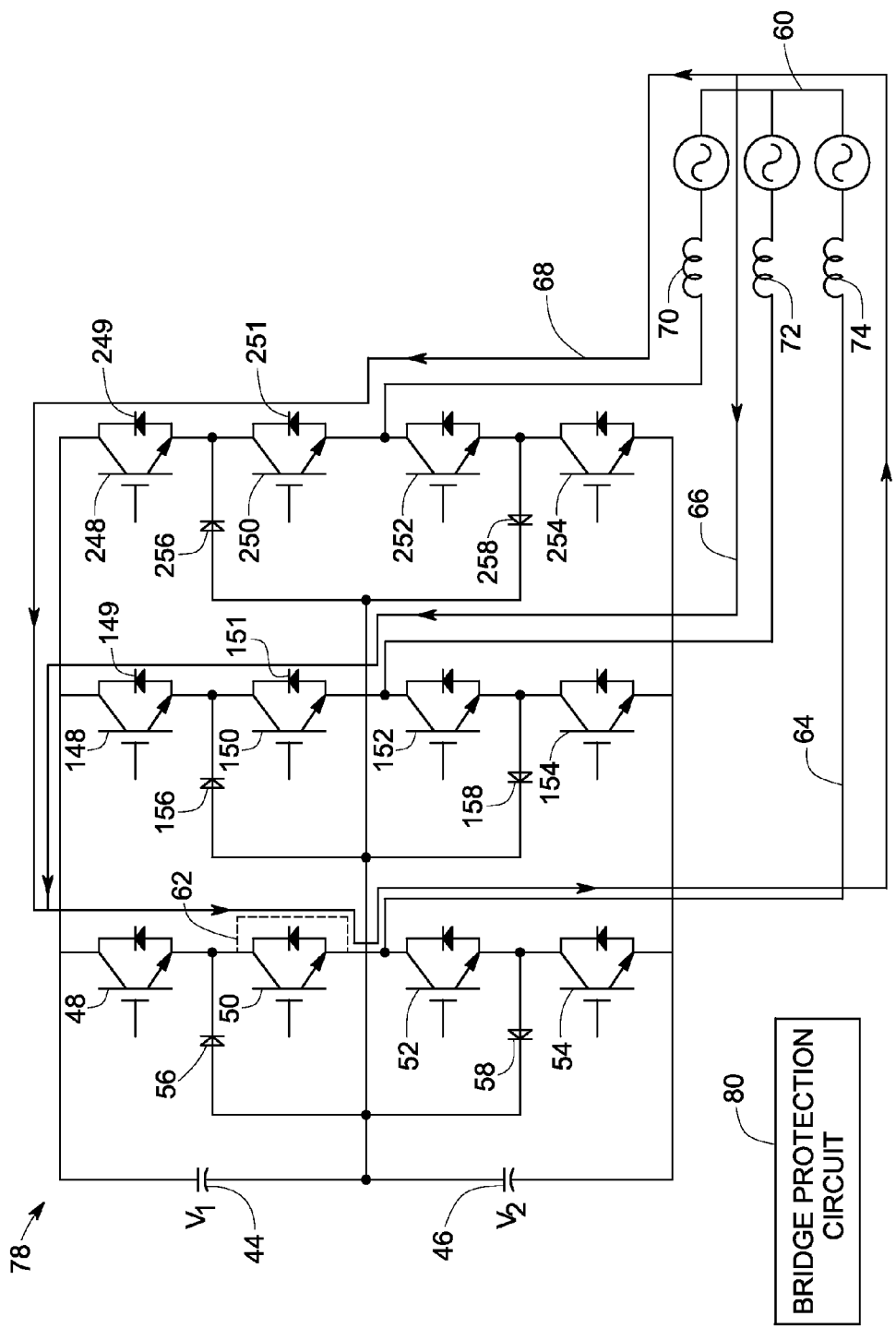
FIG. 3 is a circuit diagram of a three phase three level NPC converter connected to a power grid, illustrating different current paths when equipped with a protection circuit, in accordance with an embodiment of the present invention.

FIG. 3 shows a three phase three level NPC converter 78 with a bridge protection circuit 80 in accordance with an embodiment of the present invention. It should be noted that even though the protection circuit is explained with respect to a three phase converter, it can additionally be used for different types of converters with one example including a single phase converter. In operation, the circuit detects failures of inner switching devices 50, 52, 150, 152, 250, 252 and clamping diodes 56, 58, 156, 158, 256 and 258. Upon detection of a failure of one of the devices or the clamping diodes, the circuit sends a gate signal to the respective adjacent outer switching device to turn that device ON and a gate signal to remaining inner and outer switching devices of the NPC converter to turn those switching devices OFF. For example, if the circuit detects that inner switching device 50 or clamping diode 56 fails short, then it sends a gate signal to turn ON adjacent outer switching device 48 and gate signals to turn OFF remaining switching devices 52, 54, 148, 150, 152, 154, 248, 250, 252, and 254. It should be noted that the switching devices described herein may comprise devices such as IGBTs, IGCTs, MCTs, MTOs, and MOSFETs, for example. Such devices may be fabricated from any suitable semiconductor material with silicon and silicon carbide being two non-limiting examples.

In one embodiment, bridge protection circuit 80 may use other measurements and logic signals in addition to those described above to detect the failure mode and determine a protection strategy. As an example, other measurements may include phase current measurements, phase voltage measurements, and DC bus voltage measurements.

The above switching of switching devices results in the power grid terminals or the load terminals being short circuited through grid impedances 70, 72, 74, freewheeling diodes 149, 151 of phase B, and 249, 251 of phase C, outer switching device 48 and inner shorted switching device 50. As can be seen from FIG. 3, the new phase currents 82, 84, and 86 do not pass through top capacitor 44 and hence do not charge it. Thus, top capacitor 44 does not get charged to a voltage higher than its rated value i.e., Vdc/2. This control operation prevents failure of phase legs connected to same DC bus (other than the already failed phase leg) due to overvoltage. For example, with respect to FIG. 3 phase A and phase B would be protected in case of failure of phase C. It should be noted that the failed inner switching device 50 and adjacent outer switching device 48 will carry short circuit current Isc, whereas the other switching devices 148, 150, 248, and 250 will carry only half the short circuit current i.e., Isc/2. The value of the short circuit current depends on grid impedances 70, 72, and 74. In certain embodiments, the short circuit current Isc may be higher than rated current ratings of the switching devices. Since adjacent switching device 48 carries the current Isc, adjacent switching device 48 may fail due to overcurrent or overheating conditions. However, phase legs (each comprising four switching devices and two diodes) of the NPC converter are generally each packaged as a single unit such that if any one of the four switching devices or the two diodes in the unit fails, the entire unit is replaced. Thus, even if switching device 48 fails subsequent to the failure of switching device 50, this failure will not result in any increased cost. Thus, avoiding overcharging of top capacitor 44 results in protection of the switching devices in the remaining phase legs.

Figure 4:
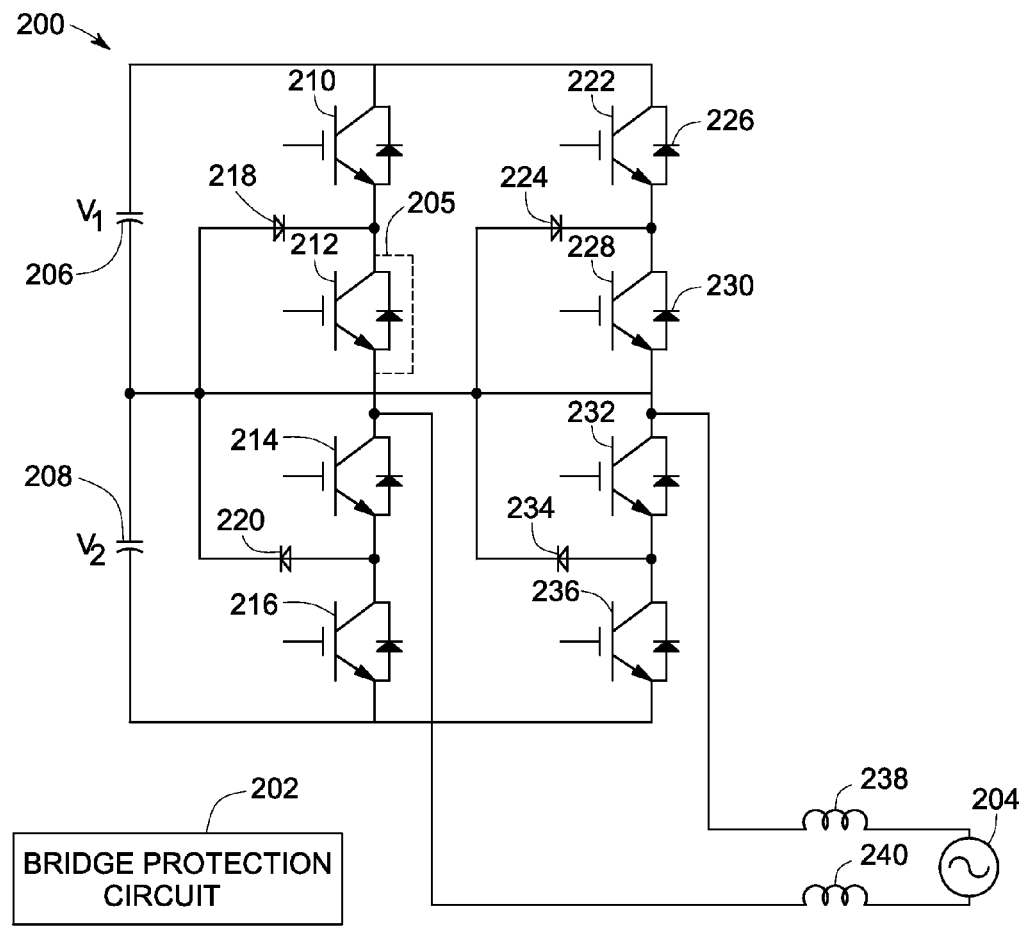
FIG. 4 is a circuit diagram of a single phase three level NPC converter connected to a single phase power source with a protection circuit, in accordance with an embodiment of the present invention.

FIG. 4 shows a single phase three level NPC converter 200 with a bridge protection circuit 202 in accordance with an embodiment of the present invention. NPC converter 200 includes two phase legs comprising outer switching devices 210, 216 for left leg and 222, 236 for right leg and inner switching devices 212, 214 for left leg and 228, 232 for right leg. NPC converter 200 further includes two clamping diodes for each leg, 218, 220 for left leg and 224, 234 for right leg. During normal operation, a single phase voltage source 204 charges DC link capacitors 206 and 208 equally. However, when an inner component such as an inner switching device 212 fails short (represented by referral numeral 205), in absence of protection circuit 202, capacitor 206 charges to peak of single phase alternating current (AC) voltage. Since the peak single phase AC voltage is typically higher than the maximum allowed blocking voltage of the switching devices utilized in the NPC converter, failure of these switching devices may occur because of the overvoltage.

When bridge protection circuit 202 detects failure of an inner component i.e., inner switching device or clamping diode, it provides a turn ON gate signal to an adjacent outer switching device and turn OFF gate signal to remaining switching devices. Thus, in the present case, bridge protection circuit 202 provides turn ON signal for switching device 210 and turn OFF gating signal for remaining switching devices 214, 216, 222, 228, 232 and 236. This condition short circuits single phase voltage source 204 and the short circuit current flows through phase impedances 238, 240, freewheeling diodes 226, 230 and switching devices 210 and 212. Thus, top capacitor 206 does not charge to a voltage higher than its rated voltage.

Figure 5:
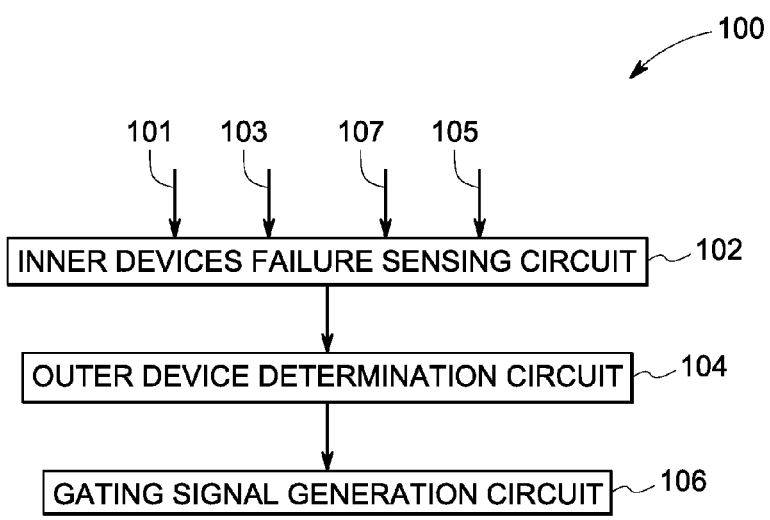
FIG. 5 is a block diagram of a protection circuit in accordance with an embodiment of the present invention.

FIG. 5 shows a bridge protection circuit 100 in accordance with an embodiment of the present invention. Circuit inputs may include phase current measurements 101, phase voltage measurements 105, DC link voltage measurements 103 and feedback signals from various gate drive circuits utilized for various switching devices. Circuit 100 includes an inner component failure sensing circuit 102, an outer switching device determination circuit 104 and a gating signal generation circuit 106. It should be noted that even though various components of bridge protection circuit 100 are listed as circuits, they can as well be part of a processing circuit program or an algorithm. In one embodiment, circuit 100 is part of the existing processing circuit of the NPC converter employed during normal conditions.

The inner component failure sensing circuit 102 generates a signal when one of the inner components such as inner switching device or clamping diode fails short. For example if switching device 50 of FIG. 3 fails short, circuit 102 generates a signal indicative of its failure and passes the signal to outer switching device determination circuit 104. Circuit 104 then determines which outer switching device is adjacent to the failed inner switching device. In one embodiment, instead of outer switching device determination circuit 104, a software may be programmed to store an adjacent outer switching device for each of the inner switching devices and clamping diodes. For the present example, circuit 104 determines that switching device 48 is the adjacent outer switching device to failed switching device 50 and then transmits this information to gating signal generation circuit 106. The gating signal generation circuit then provides turn ON signals to adjacent outer switching device 50 and turn OFF signals to remaining switching devices 52, 54, 148, 150, 152, 154, 248, 250, 252, and 254.

One of the advantages of the proposed scheme is that it prevents the entire NPC converter bridge from failure when one of the inner switching devices or clamping diodes has failed without requiring additional hardware.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A three level neutral point clamped (NPC) converter comprising:
 a plurality of phase legs each having at least two inner switching devices, at least two outer switching devices and at least two clamping diodes; and
 a protection circuit comprising
 an inner component failure sensing circuit to detect a failure condition in any of the inner switching devices or clamping diodes,
 a gating signal generation circuit to generate a turn ON signal for a respective outer switching device that is adjacent to the failed inner switching device or the failed clamping diode when the failure condition is detected.

2. The three level NPC converter of claim 1, wherein, upon the detection of the failure condition, the gating signal generation circuit is further configured to generate turn OFF signals for remaining switching devices in the three level NPC converter.

3. The three level NPC converter of claim 1, wherein the three level converter comprises a single phase three level converter.

4. The three level NPC converter of claim 1, wherein the three level converter comprises a three phase three level converter.

5. The three level NPC converter of claim 1, wherein the inner and outer switching devices are selected from the group consisting of IGBTs, IGCTs, MCTs, MTOs, and MOSFETs.

6. A method of protecting a three level power converter comprising DC link capacitors and phase legs including switching devices and connected to a power network, the method comprising:
 blocking charging of at least one DC link capacitor by short circuiting the power network through network impedances and turning off at least some of the switching devices.

7. The method of claim 6, wherein blocking comprises turning ON an adjacent outer switching device to a failed inner component of the three level converter.

8. The method of claim 7, further comprising turning OFF remaining switching devices in the three level converter.

9. The method of claim 6, wherein the three level converter comprises a single phase three level converter.

10. The method of claim 6, wherein the three level converter comprises a three phase three level converter.

11. A protection circuit for a three level neutral point clamped (NPC) converter comprising a plurality of phase legs each having at least two inner switching devices, at least two outer switching devices and at least two clamping diodes, the protection circuit comprising:

an inner component failure sensing circuit to detect a failure condition in any of the inner switching devices or clamping diodes;

a gating signal generation circuit to generate a turn ON signal for a respective outer switching device that is adjacent to the failed inner switching device or the failed clamping diode when the failure condition is detected and to generate turn OFF signals for remaining switching devices in the three level NPC converter.

12. The protection circuit of claim 11, wherein the three level converter comprises a single phase three level converter.

13. The protection circuit of claim 11, wherein the three level converter comprises a three phase three level converter.

14. The protection circuit of claim 11, wherein the inner and outer switching devices are selected from the group consisting of IGBTs, IGCTs, MCTs, MTOs, and MOSFETs.

\* \* \* \* \*